Oct. 20, 1936.　　　A. J. BARRETT　　　2,057,814
FILTER TUBE
Filed Dec. 15, 1934
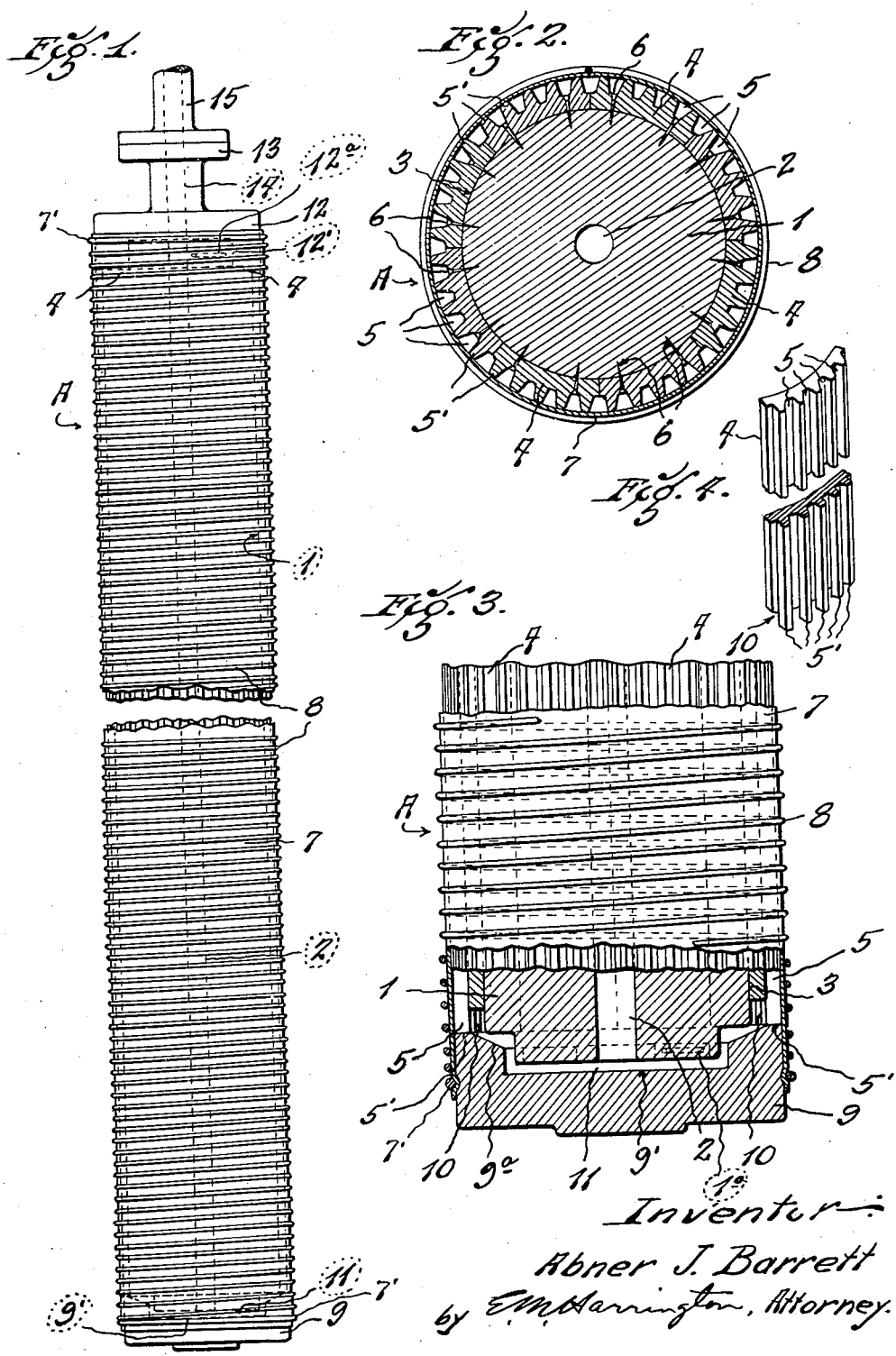
Inventor:
Abner J. Barrett
by E. M. Harrington, Attorney.

Patented Oct. 20, 1936

2,057,814

UNITED STATES PATENT OFFICE 2,057,814

FILTER TUBE

Abner J. Barrett, Webster Groves, Mo.

Application December 15, 1934, Serial No. 757,676

4 Claims. (Cl. 210—184)

This invention relates generally to filters, and more specifically to tubes for filters of the tube type, the predominant object of the invention being to provide a filter tube which is of such improved construction and arrangement that the manufacture and maintenance of the improved filter tubes are very greatly simplified, and the period of usefulness thereof is substantially prolonged over that obtained in the use of filter tubes of the construction formerly employed.

A tube filter of the type to which this invention relates generally comprises a suitable tank, or other receptacle, in which a plurality of filter tubes is suspended in the liquid or semi-liquid matter contained within the receptacle which is to be filtered. Each filter tube ordinarily comprises an elongated body portion formed of cypress or other suitable wood, which has formed longitudinally therethrough a centrally located passageway. Also, the body portion of each filter tube is provided at its outer face with a plurality of circumferentially spaced, longitudinally extended grooves, which extend from end to end of the body portion and are arranged in communication with the central, longitudinal passageway. Arranged about the body portion of each filter tube is a fabric covering which serves as the filtering cloth and closes the outer ends of the longitudinal grooves at the circumferential face of the tube body portion.

The tubes of a tube filter of the type described are all arranged in co-operative association with suitable means for creating vacuum within the central, longitudinal passageways and longitudinal, circumferential grooves of the tubes, and also the filter tubes are arranged in co-operative association with means for forcing air under pressure through said central, longitudinal passageways and said longitudinal circumferential grooves of the filter tubes. Likewise, the filter structure includes automatically actuated controlling means which is operated to permit creation of a vacuum within the central, longitudinal passageways and the circumferential, longitudinal grooves of the filter tubes, or the passage of air under pressure through said central, longitudinal passageways and the circumferential, longitudinal grooves of the filter tubes.

When in the operation of tube filters of the type under consideration the controlling means is properly set, a vacuum is created in the central, longitudinal passageways and in the longitudinal, circumferential grooves of the filter tubes, which causes liquid within the receptacle of the filter to be drawn through the fabric coverings of the filter tubes, into the longitudinal, circumferential grooves, this liquid passing from said grooves into and through the central longitudinal passageways whence it is drawn from the filter to a place of disposition. Solid matter in the liquid so drawn from the receptacle cannot pass through the fabric coverings of the filter tubes, and therefore this solid matter clings to the outer face of said fabric coverings. After the vacuum within the central passageways and circumferential grooves of the filter tubes has been maintained a predetermined length of time, the setting of the controlling means is automatically changed and air under pressure is passed through said central passageways and circumferential grooves of the filter tubes, with the result that this air is forced outwardly through the fabric coverings of the filter tubes and the solid particles clinging to the outer faces of the fabric coverings are blown therefrom and fall to the bottom of the receptacle, whence said solid matter is removed by suitable conveying means. This manner of operation is continued during entire use of the filter, there being successive creation of vacuum within and passage of air under pressure through the central passageways and the circumferential grooves of the filter tubes. During such operation of the filter, a flow of matter to be filtered is maintained to the receptacle and the liquid and solid parts of said matter are separately withdrawn from the receptacle as the filtering operations are performed.

Prior to this invention various methods of providing the filter tubes with the longitudinally extended, circumferentially spaced grooves were followed. The first of these methods was to cut the grooves directly in the circumferential face of the tube, but this method was found to be time-consuming, laborious, and quite expensive. The next method adopted was to secure to the circumferential face of a tube a plurality of individual strips of wood which were spaced circumferentially of the tube so as to provide the grooves. This method also was expensive and laborious, and it had the additional disadvantage that the heads of the nails which were employed to secure the strips to the tube caused the fabric coverings of the tubes to become worn and torn at the locations of said nail heads.

In view of the foregoing, I have devised the improved filter tube disclosed herein, which, briefly stated, comprises a body portion to the circumferential face of which a plurality of arcuate elements is secured. Each of the arcuate elements is provided at its outer face with a plurality of spaced grooves, and, when in their assembled condition in association with the body portion of a tube, the assembled arcuate elements surround the body portion of the tube in contact with the circumferential face thereof, and said arcuate elements extend substantially from end to end of the body portion of the tube. Thus the improved filter tube is provided with a multiplicity of grooves at its outer face which are spaced circumferentially of the tube and extend longitudinally thereof from end to end of the tube. The arcuate elements are secured to the body portion of a filter tube by nails, but these nails are driven into place so that the heads thereof are located at the bases of the circumferential grooves. Because of this arrangement the heads of the nails do not come into contact with the fabric covering of a filter tube, and no damage can be done to said fabric covering by said nail heads.

Fig. 1 is a view, partly in side elevation and partly in section, of a filter tube constructed in accordance with this invention, a part of the filter tube being broken away to conserve space.

Fig. 2 is an enlarged horizontal section of the filter tube illustrated in Fig. 1.

Fig. 3 is an enlarged fragmentary view, partly in elevation and partly in section, of the lower portion of the improved filter tube.

Fig. 4 is a fragmentary perspective on a reduced scale of one of the arcuate elements of the improved filter tube.

In the drawing, wherein is shown for the purpose of illustration, merely, one embodiment of the invention, A designates the improved filter tube generally. The filter tube A includes a body portion 1, which preferably is formed of cypress and is provided with a passageway 2 located centrally thereof and extended longitudinally through said body portion from end to end. The presence of the central passageway 2 renders the body portion 1 of tubular form.

Secured to the circumferential face 3 of the body portion 1 is a plurality of arcuate elements 4. Each of the arcuate elements 4 is provided at its outer face with a plurality of grooves 5 which extend longitudinally from end to end thereof, said grooves being arranged in spaced relation, as shown clearly in Fig. 2. When the arcuate elements are arranged in their assembled relation in association with the body portion 1 they surround said body portion, the opposed ends of each arcuate element abutting against ends of adjacently located arcuate elements, and the assembly of arcuate elements providing the body portion 1 with an outer face which comprises alternately arranged grooves and ridges that extend longitudinally of the body portion. The arcuate elements 4 are secured to the body portion 1 by nails or other suitable fastening devices 6, and an important feature of the invention is that these fastening devices are driven through portions of the arcuate elements 4 which are located at the bases of the grooves 5. Thus when nails are employed as the fastening means, the heads of such nails are seated at the inner ends of the grooves.

Arranged about the portion of the filter tube A which is produced by the assembled arcuate elements 4 and the body portion 1 is a covering 7 of suitable filtering fabric. The fabric covering is drawn to a tight condition in contact with the outer faces of the ridges between the grooves 5 of the arcuate elements 4 and therefore said fabric covering closes the outer ends of the grooves 5 as shown clearly in Fig. 2. The filter tube A includes also a wire 8 which is wound spirally about the tube from end to end in contact with the outer face of the fabric covering 7, as shown in Figs. 1, 2, and 3 in order to retain the fabric covering securely in place.

At the lower end thereof the filter tube A is provided with a head 9 which preferably is formed of lead. The head 9 is provided with a cavity 9' formed therein which is provided with an inclined upper face 9ª. As will be noted in Figs. 3 and 4, the lower portions of the arcuate elements 4 are cut away at the innermost side thereof as indicated at 10, and because of this arrangement the ridge portions 5' located between the longitudinal grooves 5 of said arcuate elements extend downwardly a slight distance below the lower ends of the inner portions of said arcuate elements which are located inwardly of the grooves 5. The lower faces of the ridges 5' contact with the top face of the head 9, and the lower end portion of the body portion 1 of the filter tube is cut away as indicated at 1' and the reduced lower portion of said body portion is extended into the cavity 9' of the head 9. The lower face of the body portion 1 is spaced apart in an upward direction from the bottom face of the cavity 9' of the head 9, and the side face of the reduced lower portion of the body portion 1 is spaced from the side face of the cavity 9'. This provides a space or passageway 11 which places the central, longitudinal passageway 2 of the body portion 1 in direct communication with the longitudinal, circumferential grooves 5. The head 9 is retained in place at the lower end of the filter tube, preferably by a pin 1ª which passes through a portion of said head and into the body portion 1 of the filter tube A.

The upper end of the filter tube A is provided with a head 12 which preferably is formed of lead. The head 12 is provided with a cavity 12' which receives the reduced upper end portion of the body 1 of the filter tube A. The head 12 is secured to the body portion of the filter tube by a pin 12ª. The head 12 includes an upwardly extended neck portion which is provided with a flange 13 at its top, and a passageway 14 formed through said head communicates with the passageway 2 formed through the body portion 1 of the filter tube. The head 12 has attached to it a flanged conductor 15, and the conductors 15 of all of the filter tubes associated with a filter lead to a suitable manifold (not shown) which in turn is connected to means (not shown) for creating vacuum within the passageways 2 and grooves 5 and means for forcing air through said passageway 2 and grooves 5.

The upper and lower portions of the fabric covering 7 embrace portions of the heads 9 and 12, and elements 7' are provided at said upper and lower ends of said fabric covering which draw portions of the fabric covering into annular grooves formed in said heads 9 and 12 and thus aid in securing the fabric covering in place.

The operation of the improved filter tube disclosed herein is perfectly obvious in view of what has been said herein regarding the operation of similar filter tubes formerly employed. In other words, vacuum created in the passageway 2 and grooves 5 causes liquid to be drawn through the fabric covering 7 into the grooves 5, and said liquid moves through the passageways 11, 2, and 14 to a place of disposition of said liquid. This causes the solid particles in the matter being filtered which cannot pass through the fabric covering to cling to the outer face of the fabric covering 7, and said solid particles are thereafter blown from the outer face of the fabric covering by air under pressure which passes through the passageways 14, 2, and 11 and grooves 5 and is forced outwardly from said grooves 5 through the fabric covering 7.

By providing the improved filter tube with the arcuate elements 4 which are each provided with a plurality of longitudinally extended, spaced apart grooves, the task of manufacturing the filter tubes and maintaining said filter tubes in repair is very greatly simplified, whereby a great saving in the expense of this work is realized. Also, by seating the heads of the nails or other fastening devices at the bases of the longitudinal, circumferential grooves 5 wearing and tearing of the fabric covering which heretofore resulted from contact of the fabric covering with nail heads is eliminated.

I claim:

1. A filter tube including a body portion having a passageway formed longitudinally therethrough, a plurality of elements located at the outer face of said body portion and arranged so that the opposite ends of each of said elements abut against ends of adjacently located elements, a plurality of spaced apart grooves formed at the outer face of each of said elements and extended longitudinally thereof, the inner face of each of said elements being in contact throughout with said body portion, means for securing said elements to said body portion, means for placing said grooves in communication with said passageway, and a filter cloth arranged to close said grooves, said means for securing said elements to said body portion being extended through the portions of the elements located at the bases of said grooves and said filter cloth being supported by said elements at the outer ends of said grooves.

2. A filter tube including a body portion having a passageway formed longitudinally therethrough, a plurality of elements located at the outer face of said body portion and arranged so that the opposite ends of each of said elements abut against ends of adjacently located elements, a plurality of spaced apart grooves formed at the outer face of each of said elements and extended longitudinally thereof, the inner face of each of said elements being in contact throughout with said body portion, means for securing said elements to said body portion, means for placing said grooves in communication with said passageway, and a filter cloth arranged to close said grooves, said means for securing said elements to said body portion being extended through and seated in the portions of the elements located at the bases of said grooves and said filter cloth being supported by said elements at the outer ends of said grooves.

3. A filter tube including a body portion having a passageway formed longitudinally therethrough, a plurality of elements located at the outer face of said body portion and arranged so that the opposite ends of each of said elements abut against ends of adjacently located elements, a plurality of spaced apart grooves formed at the outer face of each of said elements and extended longitudinally thereof, the inner face of each of said elements being in contact throughout with said body portion, means for securing said elements to said body portion, means for placing said grooves in communication with said passageway, a filter cloth arranged to close said grooves, said means for securing said elements to said body portion being extended through and seated in the portions of the elements located at the bases of said grooves and said filter cloth being supported by said elements at the outer ends of said grooves, and a strand of material wound spirally around said filter cloth for retaining same in place.

4. A filter tube including a body portion having a passageway formed longitudinaly therethrough, a plurality of elements located at the outer face of said body portion and arranged so that the opposite ends of each of said elements abut against ends of adjacently located elements, a plurality of spaced apart grooves formed at the outer face of each of said elements and extended longitudinally thereof, the inner face of each of said elements being in contact throughout with said body portion, means for securing said elements to said body portion, means for placing said grooves in communication with said passageway, the last-mentioned means including a head provided with a cavity into which a portion of the body portion extends, a passageway provided within said cavity with which the longitudinal passageway formed through the body portion communicates, and said elements being provided with cut away portions at their lower ends which expose the grooves of said elements to communication with said passageway within said head, and a filter cloth arranged to close said grooves, said means for securing said elements to said body portion being extended through and seated in the portions of the elements located at the bases of said grooves and said filter cloth being supported by said elements at the outer ends of said grooves.

ABNER J. BARRETT.